(12) United States Patent
Furudate et al.

(10) Patent No.: US 6,420,956 B1
(45) Date of Patent: Jul. 16, 2002

(54) DETECTION DEVICE IN WHICH OUTPUT VARIES WITH AMOUNT BY WHICH ELASTICALLY DEFORMABLE CONTACT ELEMENT IS PRESSED

(75) Inventors: Toshio Furudate, Fukushima-ken; Ryoichi Maeda, Miyagi-ken, both of (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/918,184

(22) Filed: Jul. 30, 2001

(30) Foreign Application Priority Data

Jul. 31, 2000 (JP) .......................................... 2000-230220

(51) Int. Cl.$^7$ ................................................ H01C 10/06
(52) U.S. Cl. ............................ 338/96; 338/47; 338/48; 338/122; 338/92; 338/114
(58) Field of Search .............................. 338/47, 48, 92, 338/93, 94, 95, 96, 97, 114, 154, 120, 121, 122, 123

(56) References Cited

U.S. PATENT DOCUMENTS

| | | | | |
|---|---|---|---|---|
| 1,683,059 A | * | 9/1928 | Van Deventer | |
| 4,847,586 A | * | 7/1989 | Tanaga et al. | 338/114 |
| 5,853,326 A | | 12/1998 | Goto et al. | |
| 5,912,612 A | * | 6/1999 | DeVolpi | 338/95 |
| 5,945,929 A | * | 8/1999 | Westra | 341/34 |
| 5,949,325 A | * | 9/1999 | Devolpi | 338/154 |
| 6,275,138 B1 | * | 8/2001 | Maeda | 338/47 |

FOREIGN PATENT DOCUMENTS

JP 402275603 * 11/1990 .................. 338/47

* cited by examiner

*Primary Examiner*—Karl D. Easthom
(74) *Attorney, Agent, or Firm*—Brinks Hofer Gilson & Lione

(57) ABSTRACT

A first resistive element and a second resistive element are serially connected to each other, and a contact element having a lower resistivity than the first resistive element elastically contacts the first resistive element. The resistance between both ends of the first resistive element varies with the contact area between the first resistive element and the contact element. When a predetermined voltage is applied to the first and the second resistive elements, an output voltage, which corresponds to the resistance ratio of the first resistive element to the second resistive element, is obtained from a conductive pattern. When the resistance ratio of the first resistive element to the second resistive element is set in the range of 1 to 3, the linearity is improved and a wide variation range of the output voltage is obtained.

3 Claims, 2 Drawing Sheets

DETECTION DEVICE IN WHICH OUTPUT VARIES WITH AMOUNT BY WHICH ELASTICALLY DEFORMABLE CONTACT ELEMENT IS PRESSED

BACKGROUND OF THE INVENTION

1. Field of the Invention

The present invention relates to a detection device which includes an elastically deformable contact element and in which detection output varies with the amount by which the contact element is pressed.

2. Description of the Related Art

Input units of game controllers, etc., contain detection devices for obtaining detection outputs which correspond to input operations using operation buttons. Some detection devices detect only an ON-OFF operation, and in other detection devices, the detection outputs vary with the amounts by which the operation buttons are pressed.

Such detection devices, in which the detection outputs vary with the amounts by which the operation buttons are pressed, are constructed as follows. That is, a resistive element formed of a resistive material having a relatively high resistivity is disposed on a substrate, and an elastically deformable element formed of a resistive material having a lower resistivity than the resistive element is used as a contact element for contacting the resistive element.

When the contact element having a relatively low resistivity is pressed against the resistive element having a relatively high resistivity and the contact area therebetween is changed, the total resistance of the resistive element and the contact element is also changed. Accordingly, the detection output is also changed.

In the case in which a game apparatus, etc., contains such a detection device as described above and is controlled based on the detection output, the total resistance preferably varies linearly with the contact area when the contact element is pressed. In addition, it is necessary to make a variation range of the detection output, in which the detection output varies with the contact area between the resistive element and the contact element, as wide as possible. However, the linearity of the resistance variation and the variation range of the detection output contradict each other; when the linearity is improved, the variation range is reduced, and when the variation range is increased, the linearity is degraded.

In addition, in the case in which current is applied to the resistive element and the variation of the contact area between the resistive element and the contact element is determined based on a voltage variation, the detection output is affected by resistance variation caused due to temperature variation of the environment. In addition, when multiple detection devices are manufactured, the detection output is also affected by the differences in resistances of the resistive elements which occur in the manufacturing process.

SUMMARY OF THE INVENTION

Accordingly, in order to solve the above-described problems, it is an object of the present invention to provide a detection device in which the linearity is improved and a wide variation range is obtained, and in which the detection output is not affected by the temperature variation, etc., in the environment.

According to the present invention, a detection device includes a first resistive element; a second resistive element which is serially connected to the first resistive element; and a contact element which is elastically deformable and has a smaller resistivity than the first resistive element. When the contact element is pressed against a first resistive element, a contact area between the contact element and the first resistive element varies in accordance with a pressing force. A predetermined voltage is applied to the first resistive element and the second resistive element, and a detection value is given from the potential between the first resistive element and the second resistive element. In addition, a resistance ratio of the first resistive element to the second resistive element (resistance of the first resistive element/ resistance of the second resistive element) is 3 or less.

Preferably, the resistance ratio (resistance of the first resistive element/resistance of the second resistive element) is 1 or more.

According to the present invention, the second resistive element has a fixed resistance, and the detection output is determined by obtaining a resistance variation, which is caused when the contact element contacts the first resistive element, based on the variation of the ratio of the variable resistance to the fixed resistance.

It is not necessary that the second resistive element be formed of a single resistor; it may be formed of a plurality of resistors which are connected in either a parallel or serial manner. In addition, the first resistive element may also include a plurality of resistors which are connected in either parallel or serial manner, and the resistors may be individually provided with contact elements for contacting the resistors.

The contact element may be provided to an operation button which projects outward from a casing and which can be pressed inward, and a detection output may be obtained in accordance with the contact area between the contact element and the first resistive element which varies when the operation button is pressed.

According to the present invention, the detection device in which the detection output varies with the amount by which the contact element is pressed is obtained. In addition, the detection output has an improved linearity and high resolution, and the operability is not degraded.

DESCRIPTION OF THE PREFERRED EMBODIMENT

Figure 1:
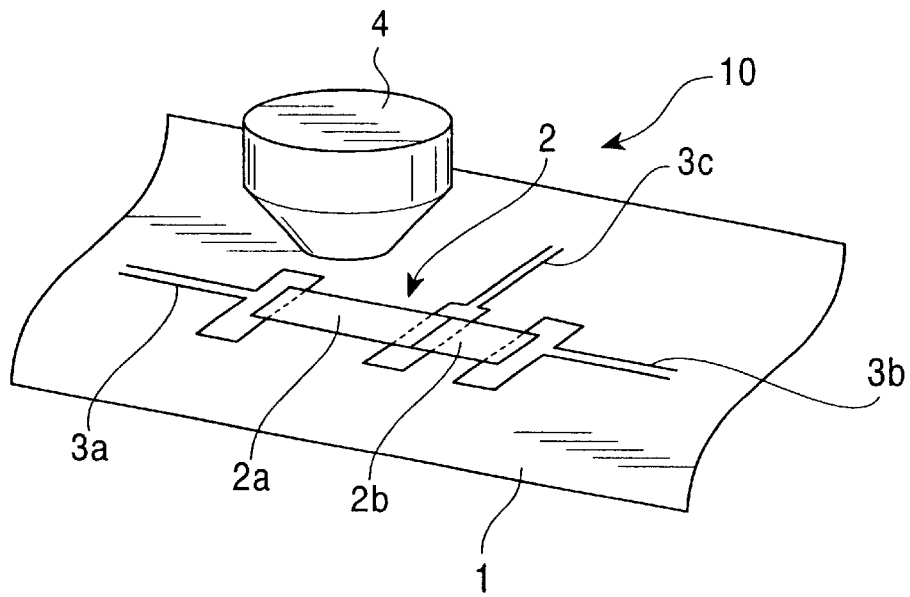
FIG. 1 is a perspective view of a detection device according to an embodiment of the present invention.

A detection device 10 according to an embodiment of the present invention is shown in FIG. 1. The detection device 10 can be installed in, for example, a controller of a game apparatus, and used as an operation unit for controlling a car speed in a car racing game, etc.

The detection device 10 includes a first resistive element 2a and a second resistive element 2b which are serially arranged on a substrate 1. The first resistive element 2a and the second resistive element 2b are formed by printing patterns thereof with a resin, etc., containing carbon. One end of the first resistive element 2a and one end of the second resistive element 2b are connected to each other by a conductive pattern 3c. In addition, a conductive pattern 3a is formed at the other end of the first resistive element 2a, and a conductive pattern 3b is formed at the other end of the second resistive element 2b.

A contact element 4 is retained above the first resistive element 2a in such a manner that the contact element 4 can be brought into contact with and be separated from the first resistive element 2a. The contact element 4 is a conductive, elastic member having the shape like a circular cone of which the vertex is evenly cut off, and is formed by combining an elastic material such as rubber, etc., and a conductive material such as carbon, etc. The resistivity of the contact element 4 is lower than that of the first resistive element 2a, and the conductive patterns 3a, 3b, and 3c are formed of a conductive material such as copper, silver, etc., which has a lower resistivity than the contact element 4.

Figure 2:
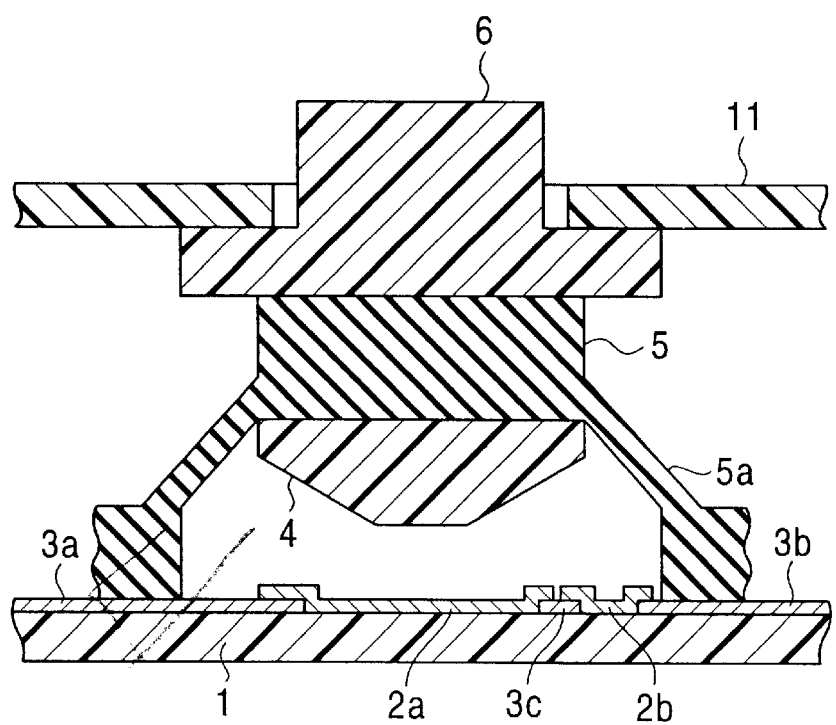
FIG. 2 is a sectional view of a controller in which the detection device is installed.

As shown in FIG. 2, the contact element 4 is retained by a retainer 5, which is an elastic member formed of rubber, etc., and which projects upward from the substrate 1. The retainer 5 includes leg portions 5a which are bendable and which extend at an angle to the periphery of the retainer 5. When the retainer 5 is pressed down, the leg portions 5a are bent inward and the contact element 4 is lowered.

On the other hand, a housing 11 of a controller is provided with an operation button 6, which is supported by the retainer 5 in such a manner that the upper end thereof projects out from the housing 11.

In the detection device 10, when the operation button 6 is not pressed down, it is held up by the elastic force applied by the retainer 5. Thus, the resistance between both ends of the first resistive element 2a is the same as the resistance of the first resistive element 2a itself.

When the operation button 6 is pressed down, the contact element 4 moves downward against the elastic force applied by the retainer 5, and comes into contact with the first resistive element 2a. In the detection device 10, the contact area between the contact element 4 and the first resistive element 2a varies with the amount by which the operation button 6 is pressed. More specifically, when the contact element 4 is already in contact with the first resistive element 2a and the operation button 6 is pressed still further downward, the amount of elastic deformation of the contact element 4 is increased in accordance with the amount by which the operation button 6 is pressed. Thus, the contact area between the contact element 4 and the first resistive element 2a is also increased. Since the resistivity of the contact element 4 is lower than that of the first resistive element 2a, the resistance between both ends of the first resistive element 2a is reduced along with the increase of the contact area.

Figure 3:
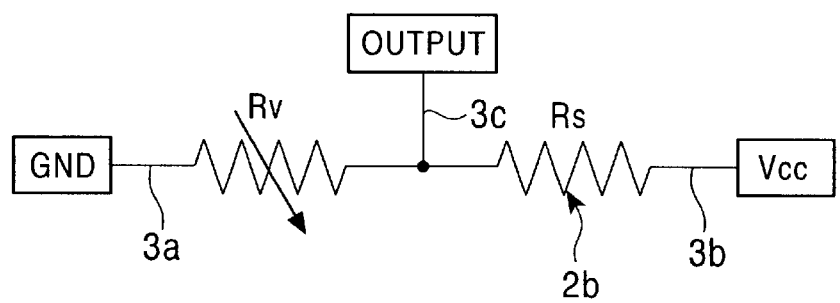
FIG. 3 is a circuit diagram of the detection device.

In the detection device 10, the contact element 4 having a low resistivity and the first resistive element 2a having a high resistivity form a variable resistor shown in FIG. 3. In FIG. 3, the variable resistor is serially connected to the second resistive element 2b, which forms a fixed resistor. The resistance between both ends of the first resistive element 2a, that is, the resistance of the variable resistor, is denoted by Rv, and the fixed resistance of the second resistive element 2b is denoted by Rs. The first resistive element 2a is connected to the conductive pattern 3a having a ground potential, and the second resistive element 2b is connected to the conductive pattern 3b, which is connected to a power supply having a voltage of Vcc. In addition, the conductive pattern 3c, which serves as an output line, is connected between the first resistive element 2a and the second resistive element 2b.

The output voltage obtained from the output line, that is, the conductive pattern 3c, can be determined as follows.

Output voltage=Vcc×{Rv/(Rs+Rv)}

As described above, the first resistive element 2a, from which the variable resistance is obtained, and the second resistive element 2b, from which the fixed resistance is obtained, are serially connected to each other. In addition, the voltage is applied to the first resistive element 2a and the second resistive element 2b, and the output voltage is obtained from between the first resistive element 2a and the second resistive element 2b. Thus, not only Rv but also Rs varies along with the temperature, etc., of the environment in which the detection device 10 is used. Accordingly, the output voltage, which is determined by the ratio of the resistances, is less affected by the changes in the environment. In addition, even when multiple detection devices are manufactured and the differences in resistances of the first resistive elements 2a and the contact elements 4 occur in the manufacturing process, the output voltage is also less affected.

In order that the output voltage varies linearly with the contact area between the first resistive element 2a and the contact element 4, a resistance ratio (the resistance of the first resistive element 2a/the resistance of the second resistive element 2b) is preferably 3 or less. In addition, in order to widen the variation range of the output voltage relative to the variation of the contact area and increase the resolution of the operation unit, the resistance ratio (the resistance of the first resistive element 2a/the resistance of the second resistive element 2b) is preferably 1 or more.

EXAMPLES

Output characteristics of examples of a detection device according to the present invention will be described below.

Figure 4:
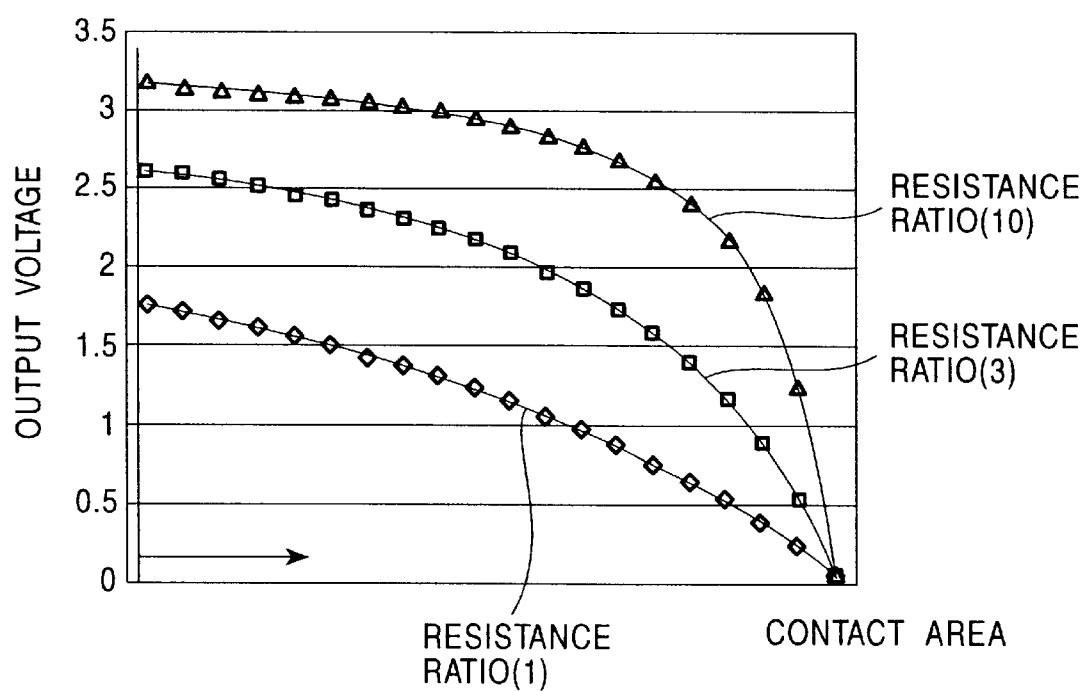
FIG. 4 is a graph showing the relationship between a contact area and an output voltage when a resistance ratio is changed.

By using the examples of the detection device 10 shown in FIGS. 1 to 3, the relationship between the contact area between the first resistive element 2a and the contact element 4 and the output voltage was determined. The result is shown in FIG. 4, in which the horizontal axis shows the contact area between the first resistive element 2a and the contact element 4, and the vertical axis shows the output signal.

Three kinds of detection devices having different resistance ratios (the resistance of the first resistive element 2a/the resistance of the second resistive element 2b) were prepared. The first detection device is a comparative example in which the resistance ratio is 10, and the result obtained by this detection device is shown by triangles in FIG. 4. The second detection device is an example in which the resistance ratio is 3, and the result obtained by this detection device is shown by rectangles in FIG. 4. The third detection device is an example in which the resistance ratio is 1, and the result obtained by this detection device is shown by rhombuses in FIG. 4.

With respect to the comparative example in which the resistance ratio is 10, when the contact area between the first resistive element 2a and the contact element 4 is small, the variation of the output voltage relative to the variation of the contact area is also small. Thus, the output voltage does not vary linearly with the contact area, and the linearity is degraded. In contrast, with respect to the examples in which the resistance ratio is 3 and 1, the relationship between the variation of the contact area and the variation of the output voltage is close to 1:1, and the linearity is improved. However, when the resistance ratio is made lower than 1, the variation range of the output voltage relative to the variation of the contact area is reduced, and the resolution of the output is degraded. Thus, the resistance ratio is preferably in the range of 1 to 3.

What is claimed is:

1. A detection device, comprising:

a first resistive element;

a second resistive element which is serially connected to the first resistive element; and a contact element which is elastically deformable and has a smaller resistivity than the first resistive element, wherein, when the contact element is pressed against a first resistive element, a contact area between the contact element and the first resistive element varies in accordance with the pressing force, wherein a predetermined voltage is applied to the first resistive element and the second resistive element, and a detection value is given from the potential between the first resistive element and the second resistive element, and wherein a resistance ratio of the first resistive element to the second resistive element (resistance of the first resistive element/resistance of the second resistive element) is 3 or less.

2. A detection device according to claim 1, wherein the resistance ratio (resistance of the first resistive element/resistance of the second resistive element) is 1 or more.

3. A detection device according to claim 1, wherein the contact element is provided to an operation button which projects outward from a casing and which can be pressed inward, and wherein a detection output is obtained in accordance with the contact area between the contact element and the first resistive element which varies when the operation button is pressed.

* * * * *